(12) United States Patent
Wagaman et al.

(10) Patent No.: US 6,849,247 B1
(45) Date of Patent: Feb. 1, 2005

(54) GAS GENERATING PROCESS FOR PROPULSION AND HYDROGEN PRODUCTION

(75) Inventors: Kerry L. Wagaman, Bryantown, MD (US); Douglas J Elstrodt, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 274 days.

(21) Appl. No.: 10/192,887

(22) Filed: Jul. 10, 2002

(51) Int. Cl.⁷ .............................. C01B 3/08; C06B 27/00
(52) U.S. Cl. ...................... 423/657; 423/652; 149/87; 149/108.2
(58) Field of Search .................... 149/87, 18, 108.2, 149/187.18; 252/373; 423/652, 657

(56) References Cited

U.S. PATENT DOCUMENTS

| | | | |
|---|---|---|---|
| 3,346,506 A | * 10/1967 | Beumel, Jr. ............. | 252/188.25 |
| 3,932,600 A | 1/1976 | Gutbier et al. ............. | 423/657 |
| 3,955,941 A | 5/1976 | Houseman et al. ............ | 48/95 |
| 3,985,866 A | 10/1976 | Oda et al. .................... | 423/657 |
| 3,986,909 A | 10/1976 | Macri ........................ | 149/19.9 |
| 5,329,758 A | 7/1994 | Urbach et al. ............. | 60/39.05 |
| 5,803,022 A | 9/1998 | Nelson et al. ................ | 123/25 |
| 6,103,143 A | 8/2000 | Sircar et al. ................ | 252/373 |

* cited by examiner

Primary Examiner—Stanley S. Silverman
Assistant Examiner—Maribel Medina
(74) Attorney, Agent, or Firm—Mark Homer

(57) ABSTRACT

A gas generating process, which is for the continuous production of energy and hydrogen for rocket and other propulsion and is also for the continuous production of hydrogen, utilizes the reaction of metallic materials, particularly aluminum, with organic materials, particularly hydrocarbons provided as jet fuel, and with water or an oxidizer which is predominantly water. In comparison with related reactions, the reaction produces hot gases containing more hydrogen and the products have a lower temperature for the same specific impulse. The process incorporates organic liquids with metallic powders to produce desirable, lower molecular weight exhaust gas products; and the increased hydrogen is desirable for use with a fuel cell and in connection with propulsion of a super-cavitating underwater device. The process is advantageous in that a metal, in powdered form, and a hydrocarbon liquid may be provided together as a slurry or gel for effective metering. The metallic material may also be provided with the organic material in the form of a binder as used in solid propellants, and the organic material and water may be provided together in the form of a water containing liquid monopropellant. The hydrogen containing product gases from the reaction may be further reacted with suitable oxidizers for production of additional energy or steam. The reaction is particularly useful for underwater vehicles where ambient water is available and the reaction products may be used for propulsion.

2 Claims, 1 Drawing Sheet

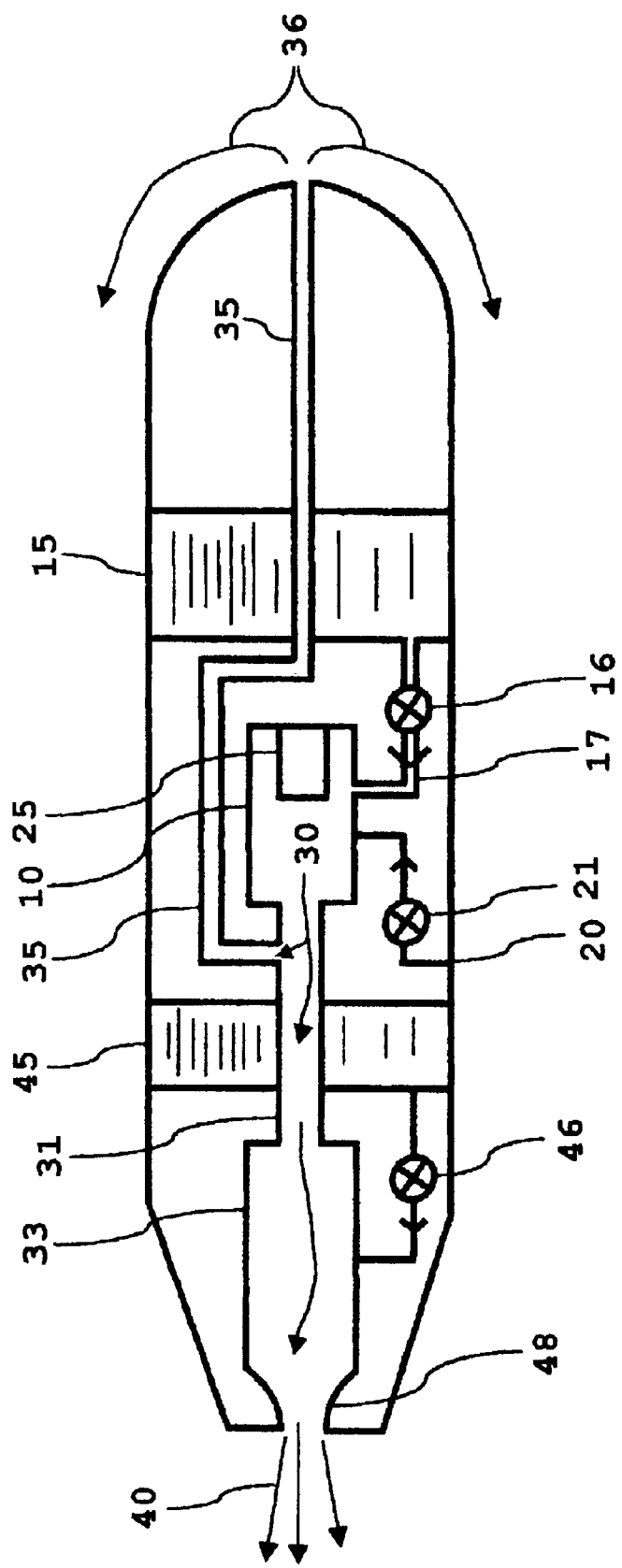

GAS GENERATING PROCESS FOR PROPULSION AND HYDROGEN PRODUCTION

BACKGROUND OF THE INVENTION (1) Field of the Invention

The present invention relates to processes for power plants and the chemistry of inorganic compounds. The invention particularly relates to such processes involving the addition of water and oxidizers other than air to provide useful power and pressurized fluid. The invention also relates to reaction processes where the product includes elemental hydrogen from decomposition of a hydrocarbon or water and where the reaction includes a metal or metallic compound.

(2) Description of the Related Art

Liquid oxidizers used for propellants typically include hydrogen peroxide, inhibited red fuming nitric acid, nitrogen tetroxide, and liquid oxygen. These oxidizers have various deficiencies including corrosivity, high initial cost, short storage life, high disposal cost, and dangerous properties such as being hypergolic. Other deficiencies include toxicity and environmental danger from both the oxidizer and its reaction products.

To avoid these deficiencies, it is known to react water and aluminum powder to provide reaction products, including hydrogen, for rocket propulsion, particularly rocket torpedo propulsion. However, arrangements using this reaction have suffered from high combustion temperatures, erosion, slaging, and problems with metering dry solids into the combustor.

As shown by the following United States Patents, the reduction of water or a hydrocarbon with a metal containing material to generate hydrogen is known, as is the use of water with the combustion of hydrocarbons in power producing devices.

U.S. Pat. No. 5,012,719, which issued 7 May 1991, discloses the generation of hydrogen for projectile propulsion from a barrel by "exothermically reacting water or a water-hydrogen peroxide liquid mixture with metal or a metal hydride", the reaction being controlled by the power provided to a plasma source from which a plasma jet is propagated into a reaction chamber containing the reaction materials. This chamber contains a honeycomb structure having different compartments filled with particles of the metal or metal hydride, water, and air in "amounts proportional to the mole fractions of the reactants in the exothermic reaction". The metals aluminum, zirconium, titanium, silicon and their hydrides are stated to be suitable. The honeycomb structure may itself be the metal or metal hydride, but may also be "fabricated of a hydrocarbon, dielectric material, such as polyethylene". It is apparent that this patent discloses a "one-shot" reaction and the use of only a small quantity of hydrocarbon which is solid and only forms a container structure. Further, this patent states: "The energy in the gas generated . . . may be 1.5 times the electric energy coupled . . . to [the] plasma source because of the additional exothermic reaction energy." It is apparent that the arrangement of U.S. Pat. No. 5,012,719 produces little more energy, or even less energy, than is required for its operation and is directed at controlling the hydrogen producing reaction for projectile propulsion rather than the production of other mechanical work or hydrogen.

U.S. Pat. No. 3,932,600 issued 13 Jan. 1976 and discloses a process for the generation of hydrogen wherein "particles of magnesium are reacted with water in the presence of at least one cobalt oxide and at least one water-soluble chloride". Aluminum may be included with the magnesium, and seawater may be used to provide the chloride. However, no hydrocarbon is utilized.

U.S. Pat. No. 3,955,941 issued 11 May 1976 and discloses a representative process for reforming hydrocarbons into hydrogen without the use of a metal as a reactant or as a catalyst. First, air and hydrocarbon fuel are ignited to "provide hot combustion gases, by partial oxidation of the hydrocarbon fuel". In a separate region, water is then injected "whereby a steam reforming reaction with the hydrocarbon fuel takes place to produce a hydrogen rich gas."

U.S. Pat. No. 3,985,866 issued 12 Oct. 1976, and discloses a method of producing high pressure, hydrogen containing gas for use as a power source by bringing a metal fuel in the form of molten droplets into contact with water. The fuel has aluminum as a primary component plus at least one of lithium, magnesium, sodium, or potassium in the form of an alloy or a mixture. For a mixture, the fuel is provided as a slurry having the auxiliary fuel component as the liquid phase, and the slurry is injected into an atmosphere containing water vapor. Seawater may be used, but no hydrocarbon is mentioned.

U.S. Pat. No. 3,986,909 issued 19 Oct. 1976 and discloses propellant compositions containing finely-divided boron present in excess of the amount oxidizable during combustion of the propellant so that the boron is ejected with the combustion products for burning in an afterburner combustion zone. The propellant includes an organic polymer binder and an inorganic oxidizer salt, and may "contain small amounts of Mg, Al, or Zr metal as ballistic or afterburner combustion modifiers." However, no water or hydrocarbon is utilized.

U.S. Pat. No. 5,329,758 issued 19 Jul. 1994 and discloses a steam-augmented gas turbine in which water is provided to a combustor along with fuel and compressed air. However, no metal is involved in the reaction, and the water does not take part in the combustion chemical reaction, but only increases the mass flow.

U.S. Pat. No. 5,803,022 issued 8 Sep. 1998 and discloses a reciprocating engine in which water is injected into a combustion chamber into which a fuel injector provides fuel-rich combustion gases ahead of steam from a water injector. The water injector may incorporate phase-change of the water by electrical heat and electrolytic dissociation of the water into hydrogen and oxygen. However, no metal containing substance is used in the power producing reaction.

U.S. Pat. No. 6,103,143 issued 15 Aug. 2000 and discloses a representative cyclic process for "steam reforming of hydrocarbon, particularly methane, under elevated temperature and pressure to produce hydrogen". Steam and hydrocarbon are "fed into a first reaction volume containing essentially only reforming catalyst to partially reform the feed." The reaction products, carbon dioxide and hydrogen, and additional feed are provided into "a second reaction volume containing a mixture of catalyst and adsorbent which removes the carbon dioxide". These reactions are followed by depressurization of the reaction volumes, purge of the adsorbent, and repressurization. Any well-known steam-methane reforming catalyst may be used, examples including nickel-alumina, nickel-magnesium alumina and the noble metal catalysts; however, no metal or oxidizer is used in the reaction itself.

SUMMARY OF THE INVENTION

The present invention is a gas generating process continuously producing energy and hydrogen. The process utilizes a metallic material, an organic chemical fuel component, and an oxidizer which is predominantly water. A basic embodiment uses aluminum metal, a hydrocarbon liquid such as jet fuel, and water. In comparison with related reactions which do not use these reactants, the process of the present invention produces hot gases containing more hydrogen and the products have a lower temperature for the same specific impulse. The increased hydrogen makes the process desirable as a hydrogen source and for propulsion. In the process, the water reacts as an oxidizer with the metallic material in high temperature reactions, and the organic chemical fuel component reacts with oxygen from the water to generate the product gases.

The reactants may be provided to or stored in a combustion chamber in which the reaction may be started by a conventional propellant ignition grain.

The proportion of water may be selected to give a desired combustion temperature. However, a high proportion of water in the overall reactants decreases the ease of ignition and the energy output.

The gases from the reaction may be provided to a further reaction zone and there burned for additional energy output by the introduction of additional oxidizing material which may be selected to provide desired propulsion related products and may be an aqueous oxidizer solution such as a PERSOL or an OXOL.

Other carbon and hydrogen containing materials, such as alcohols and liquid monopropellants, may be used as well as hydrocarbons, and the metallic material may be provided with the organic material by incorporating these materials together with the organic material being a binder as used in solid propellants. Also, the organic material and the water may be provided together in a liquid monopropellant including a nitrate.

The metallic material of the present invention may be an individual metal such as aluminum, magnesium, boron, titanium, lithium, sodium, potassium, zirconium, or tungsten. Metallic hydrides, reactive metallic oxides and carbides; and inter-reactive metal combinations such as titanium-boron may also be used as well as mixtures or alloys of these materials.

The process of the present invention is particularly advantageous in that the metallic material may be a metal in powdered form and the organic fuel component may be a hydrocarbon liquid, these materials being provided for introduction together as a slurry or gel which may be conveniently metered into a reaction zone.

The metallic material may be provided in a particle size of less than one micron to 20 microns for inclusion with a jelling agent to form a slurry with any suitable organic liquid such as fuel oil and jet fuels.

When a metal is used with a hydrocarbon, the proportion of the metal should be from 10% to 80% by weight, the higher concentrations being more desirable. Denser hydrocarbons, such as JP-10 instead of JP-4, are desirable to give a higher density specific impulse.

It is an object of the present invention to produce gases for propulsive and other energy requiring purposes.

It is also an object of the present invention to produce hydrogen.

It is an additional object of the present invention to provide for the continuous production of gases by reactions from which the gases may be further reacted to provide additional energy and desirable products.

A particular object is the production of propulsive gases from reactants providing high specific impulse and high density impulse.

Another object is to provide for the continuous production of propulsive gases and hydrogen by reactions releasing much larger amounts of energy than required to start and sustain the reaction.

Still another object is to provide reactions for the production of propulsive gases and hydrogen having lower temperatures than result from prior art processes using similar reactants.

Yet another object is the production of propulsive gases and hydrogen from reactants which may be conveniently measured and introduced into a reaction zone.

A further object is the production of propulsive gases and hydrogen from reactions which use reactants which are safe, have desirable storage characteristics, and are relatively inexpensive and which result in reaction products which are not environmentally harmful.

A still further object is to provide reactions which meet the above and other objects, which are fully effective for the production of propulsive gases and hydrogen, and which utilize logistically desirable reactants.

BRIEF DESCRIPTION OF THE DRAWING

These and other objects, advantages, and novel features of the present invention will be apparent from the following detailed description when considered with the accompanying FIGURE which is a conceptual diagram of an underwater vehicle serving as a representative operating environment for several aspects of the present invention.

DETAILED DESCRIPTION OF THE INVENTION

Referring more particularly to the drawings, the underwater vehicle shown in the FIGURE utilizes gas generating processes of the present invention for continuously producing energy and hydrogen. One embodiment of these processes occurs in a first reaction chamber 10 into which are introduced the three reactants characterizing the invention. These reactants are a metallic material, an organic chemical fuel component, and an oxidizer which is predominantly water; and, for illustrative purposes in the depicted vehicle, may be considered as the reactants of a basic embodiment using aluminum metal, a hydrocarbon liquid such as jet fuel, and water.

In the depicted embodiment, the aluminum is provided in powdered form and in a slurry together with the hydrocarbon liquid, the slurry being provided from a slurry compartment from which the slurry is metered and pumped by a pump 16 into chamber 10 through a conduit 17, the pump and conduit being conventionally represented, as are similar elements described below. In an actual embodiment of the present invention corresponding to that depicted, the metallic material may be provided in a particle size of less than one micron to 20 microns for incorporation, together with a jelling agent, in a hydrocarbon slurry with any suitable organic liquid such as the fuel oil RP-1 or the jet fuels JP-5, JP-8, and JP-10. Chamber 10 might also be fed with powdered metallic material incorporated in a gel formed from the hydrocarbon liquid and metered into the chamber by any suitable apparatus.

The metallic material and the organic fuel component may be stored separately stored and individually metered to a reaction chamber for the practice of the present invention.

In the depicted embodiment of the present invention, the oxidizer may be ambient seawater which is supplied to chamber 10 from the vehicle exterior at a location 20 by a pump and conduit indicated by numeral 21. When the preferred organic fuel component, JP-10, is utilized in an embodiment of the present invention corresponding to the depicted embodiment, the invention is highly advantageous from the standpoint of ingredient costs and logistics since the seawater is free and JP-10 is relatively inexpensive and commonly available.

In other embodiments of the present invention, The metallic material may be also be provided with the organic chemical fuel component by combining these materials with a binder as used in solid propellants and the decomposition products of these combined materials provided to a reaction chamber. If desirable, all of the organic material may be provided by the binder and the combined reactants stored in a reaction chamber otherwise corresponding to chamber 10.

In these and other embodiments of the present invention, the reaction maybe be started by a conventional propellant ignition grain disposed in the associated reaction chamber as indicated by numeral 25.

It is not necessary that the metallic material utilized with the present invention be aluminum, and it is contemplated that this material may be any other suitable individual metal such as magnesium, boron, titanium, lithium, sodium, potassium, zirconium, or tungsten. Other suitable metallic materials for the practice of the present invention are believed to be metallic hydrides such as aluminum hydride, magnesium hydride, boron hydride, zirconium hydride, or lithium-aluminum hydride; reactive metallic oxides and carbides; and inter-reactive metal combinations such as titanium-boron alloys. Mixtures or alloys of these materials may also be used.

In the practice of the present invention using a metal with a hydrocarbon, the proportion of the metal should be from 10% to 80% by weight with the higher proportions being the most desirable. When a relatively dense hydrocarbon fuel such as a jet fuel is provided as the organic material reactant, the reactants not only provide a high specific impulse, but also a high density impulse; that is, the denser material provides more thrust per volume of reactants. In this regard, more dense hydrocarbons, such as JP-10 instead of JP-4, are desirable as giving a higher density specific impulse;

In the practice of the present invention, it is contemplated that other carbon and hydrogen containing materials may be used for the organic chemical fuel component as well as, or in addition to, hydrocarbons. Examples are alcohols having one to six carbon atoms and a liquid monopropellant such as the torpedo fuel "Otto Fuel II" which is a blend of propylene glycol di-nitrate, di-butyl sebacate, and 2-dinitrophenyl amine. With these materials, as well as with hydrocarbons, the metal and organic chemical fuel component may be separately stored and metered to a reaction chamber.

A reaction in accordance with the present invention utilizes water as the predominant or only oxidizer. The water may be provided in any suitable form, may be potable water, and may be separately stored and metered to a reaction chamber for the practice of the present invention.

A suitable proportion of water in the overall reactants may be selected to give a desired and, typically, relatively low combustion temperature. However, a high proportion of water will decrease the ease of ignition and the energy output as well as the flame temperature.

Other oxidizer ingredients may be included with the water to achieve specific physical, chemical, or safety properties. When seawater is used, the water content can be selected to minimize corrosivity and erosion from the exhaust gases.

The invention may also be practiced with the organic material and the water provided together. It is contemplated that this maybe be carried out by the use of a liquid monopropellant such as aqueous solution of ethylamine nitrate and ammonium nitrate; and, in this case, additional water may not be needed as an oxidizer.

In reactions and processes of the present invention and as before stated, the water acts as an oxidizer to "burn" the metallic material to the corresponding metallic oxides in reactions having high combustion temperatures. The organic chemical fuel component, such as a hydrocarbon, "burns" with oxygen from the water and, with accompanying materials described below, variously generates the gases carbon monoxide, carbon dioxide, water, nitrogen and, in particular, hydrogen.

In comparison with related reactions which do not use together a metallic material, an organic chemical fuel component, and an oxidizer which is predominantly water, the present invention produces hot gases containing more hydrogen as well as products having a lower temperature for the same specific impulse.

In the FIGURE, the reaction product gases from above-described reactions of a metallic material, an organic chemical fuel component, and an oxidizer which is predominantly water are represented at numeral 30 by arrows showing the flow of these product gases from first reaction chamber 10 through a conduit 31 to a second reaction chamber 33 for a purpose subsequently described.

The increased hydrogen in the reaction products makes processes of the present invention desirable as a hydrogen source as for fuel cells. Also, the relatively low molecular weight exhaust products result in the reactants having, in comparison with rocket propellants in general, a high specific impulse when these products are used directly for rocket propulsion. Processes in accordance with the present invention may be optimized for the production of hydrogen for fuel cell or other chemical use, as well as for propulsion purposes, and the increased hydrogen provided by these processes makes them useful for many other hydrogen utilizing purposes which are not mentioned herein as not being a part of the invention.

In an underwater vehicle, as shown in the FIGURE where a portion of the reaction products at numeral 30 are provided by a conduit 35 to the nose of the vehicle for release thereat as indicated by arrows 36, the reaction products from a first reaction chamber corresponding to chamber 10 may be provided to the vehicle exterior to reduce drag by super-cavitation.

The advantages of the present invention, in regard to hydrogen production and reaction chamber temperature and for rocket-like propulsion, are shown by the TABLE wherein the calculated performance of prior art reactants without a hydrocarbon are compared with reactants of present invention utilizing the hydrocarbon jet fuel, JP-10.

The units of the TABLE, in which "%" is percent of total reactants by weight, are: specific impulse—pounds force thrust per pound mass of reactants per second; temperature—degrees Fahrenheit; velocity—feet per second for a "characteristic velocity" though a standardized nozzle configuration; moles hydrogen—per 100 grams of reactants. The values were calculated using the well-known "PEP Code" developed by Naval Air Weapons Center China Lake and are for a reaction chamber pressure of 5000 psi with expansion of the products to 14.7 psi.

TABLE

| Fuel | Water | Specific impulse | Chamber temperature | Velocity | Moles hydrogen |
|---|---|---|---|---|---|
| 50% Al | 50% | 269 | 5168 | 4520 | 2.76 |
| 40% Al + 10% JP-10 | 50% | 262 | 3730 | 4942 | 3.24 |
| 40% Al | 60% | 261 | 4316 | 4006 | 2.22 |
| 32% AL + 8% JP-10 | 60% | 233 | 2845 | 4162 | 2.47 |

In one aspect of the present invention, the hydrogen containing product gases corresponding to those indicated by arrows 30 may be further reacted with suitable oxidizers for production of additional energy or steam. The further reaction may take place in any suitable region such as a second reaction chamber, which may correspond to chamber 33, and the products of the further reaction, such as those indicated by arrows 40 in the FIGURE, used for any suitable purpose.

More specifically, the gases from above-described reactions of a metallic material, an organic chemical fuel component, and an oxidizer which is predominantly water may be provided to a further reaction zone or chamber and there burned for additional energy output. The further combustion may be with an aqueous oxidizer solution such as a PERSOL or an OXOL which are solutions of hydrazine nitrate and ammonium nitrate, PERSOLS also containing hydrogen peroxide and OXSOLS containing hydroxylamine perchlorate.

In the FIGURE, such an oxidizer is stored in a compartment 45 and provided to second reaction chamber 33 by a pump and conduit indicated by numeral 46. The further reaction may be selected to provide products useful for super-cavitation, for driving a conventional piston engine, or for exhausting from the second reaction chamber through a nozzle, as indicated by numeral 48, for "rocket" propulsion.

It is apparent that, when the metallic material, the organic chemical fuel component, and the predominantly water oxidizer utilized in the practice of the present invention are each supplied in flowable form, such as the before mentioned liquids and slurry, and provided to a reaction chamber corresponding to chamber 10 or 33, the reaction of these materials may be continuous. That is, the reaction may continue so long as the reactants are provided to the reaction chamber. It is also evident that such a continuous reaction may be carried out by these reactants provided as gels, gases, and gaseous decomposition products of solid materials.

It is evident that the processes of the present invention are not only particularly effective for the production of energy and hydrogen, but are also advantageous in that reactants used in the process, such as aluminum metal, jet fuel, and water are commonly available, relatively inexpensive, insensitive, and do not deteriorate in storage; and, in certain applications of the subject invention ambient sea-water may be used. Further, these reactants are not only non-toxic in themselves, but give non-toxic and environmentally safe reaction products.

Although the present invention has been herein shown and described in connection with what is conceived as the preferred embodiment, it is recognized that departures may be made therefrom within the scope of the invention which is not limited to the illustrative details disclosed.

What is claimed is:

1. A process for the production of hot gases, the process comprising:

continuously providing a first reaction zone with reactants consisting of at least one metallic element, water, and at least one compound including carbon and hydrogen;

continuously reacting said reactants to generate first hot gaseous products including hydrogen gas;

continuously exiting said first gaseous products from the first reaction zone;

providing said first products to a second reaction zone; and reacting said first products with an aqueous oxidizer solution of compounds selected from the group consisting of hydrazine nitrate, ammonium nitrate, hydrogen peroxide, and hydroxylamine perchlorate.

2. The process of claim 1 for use in an underwater vehicle wherein a portion of said first products are utilized for drag reduction and said further products are utilized for propulsion.

* * * * *